US012107508B2

(12) United States Patent
Lin et al.

(10) Patent No.: US 12,107,508 B2
(45) Date of Patent: Oct. 1, 2024

(54) SYNCHRONOUS RECTIFICATION SAMPLING CONTROL CIRCUIT, METHOD AND CHIP

(71) Applicant: Lii Semiconductor Co., LTD, Guangdong (CN)

(72) Inventors: Xinchun Lin, Guangdong (CN); Lingbo Zheng, Guangdong (CN); Min Zhu, Guangdong (CN)

(73) Assignee: Lii Semiconductor Co., LTD, Guangdong (CN)

( * ) Notice: Subject to any disclaimer, the term of this patent is extended or adjusted under 35 U.S.C. 154(b) by 169 days.

(21) Appl. No.: 17/884,611

(22) Filed: Aug. 10, 2022

(65) Prior Publication Data

US 2023/0048383 A1   Feb. 16, 2023

(30) Foreign Application Priority Data

Aug. 10, 2021 (CN) .......................... 202110913431.7

(51) Int. Cl.
| | | |
|---|---|---|
| *H02M 3/335* | (2006.01) | |
| *H02M 1/00* | (2006.01) | |
| *H02M 1/08* | (2006.01) | |

(52) U.S. Cl.
CPC ..... *H02M 3/33592* (2013.01); *H02M 1/0006* (2021.05); *H02M 1/08* (2013.01)

(58) Field of Classification Search
CPC .......................... H02M 3/33592; H02M 3/335
See application file for complete search history.

(56) References Cited

U.S. PATENT DOCUMENTS

| 10,554,140 | B1 * | 2/2020 | Khamesra | H02M 3/33592 |
| 2017/0025966 | A1 * | 1/2017 | Chang | H02M 3/33592 |
| 2020/0395863 | A1 * | 12/2020 | Song | H02M 3/33507 |
| 2021/0175790 | A1 * | 6/2021 | Ye | H02M 1/08 |

\* cited by examiner

*Primary Examiner* — Alex Torres-Rivera
(74) *Attorney, Agent, or Firm* — Cooper Legal Group, LLC

(57) ABSTRACT

The present application relates to a synchronous rectification sampling control circuit, method and chip. The control circuit includes a withstand voltage switch tube Q2, a power supply switch tube Q3, a positive phase power supply driving module, a detection control module, and a negative phase power supply module. The withstand voltage switch tube Q2 includes a withstand voltage source, a withstand voltage grid and a withstand voltage drain, in which the withstand voltage drain is configured to connect a secondary winding power supply circuit in a synchronous rectification circuit of a transformer to obtain a supply voltage and output a positive or negative sampling voltage at the withstand voltage source.

9 Claims, 1 Drawing Sheet

SYNCHRONOUS RECTIFICATION SAMPLING CONTROL CIRCUIT, METHOD AND CHIP

CROSS-REFERENCE TO RELATED APPLICATION

This application claims the priority and benefit of Chinese patent application serial no. 202110913431.7, filed on Aug. 10, 2021. The entirety of Chinese patent application serial no. 202110913431.7 is hereby incorporated by reference herein and made a part of this specification.

TECHNICAL FIELD

The present application relates to the field of rectification control, and, in particular, to a synchronous rectification sampling control circuit, method and chip.

BACKGROUND

At present, in the field of synchronous rectification, in order to solve the problem of relatively high voltage drop caused by a diode when the secondary winding of a transformer is conducting in the forward direction, generally, a low-voltage drop synchronous rectification switch is connected in parallel on the diode as a rectifier device. In addition, a synchronous rectification control chip is further provided to sample and detect whether the voltage on the secondary winding circuit of the transformer is positive or negative, so as to turn on the synchronous rectification switch when the secondary winding of the transformer is at a positive voltage, and turn off the synchronous rectification switch when the secondary winding of the transformer is at a negative voltage, thereby achieving the effect of reducing rectification power consumption.

In existing technologies, most of synchronous rectification control chips adopt resistor voltage-dividing sampling, or some of them adopt biased MOS tubes for sampling. The resistor voltage-dividing sampling is the simplest method, but this kind of sampling will cause delay and affect the output accuracy of the power generation module. When using a biased MOS tube for sampling, it is necessary to use another MOS tube to introduce current from the sampling end to charge a capacitor, so as to provide power for the synchronous rectification chip.

In the above related technology, it is found that, there is a problem that, the sampling of the sampling control circuit tends to have errors due to the unstable power supply, since there will be an unstable power supply for charging the capacitor C2 under negative voltage in the case of having to charge the charging capacitor C2 and provide power for the bias MOS tube under positive voltage at the same time.

SUMMARY OF THE PRESENT APPLICATION

In order to address the defect that the sampling control circuit tends to have errors due to unstable power supply, the present application provides a synchronous rectification sampling control circuit, method and chip.

In a first aspect, the present application provides a synchronous rectification sampling control circuit, which adopts the following technical solution:

a synchronous rectification sampling control circuit including:
a withstand voltage switch tube Q2, including a withstand voltage source, a withstand voltage grid and a withstand voltage drain, in which the withstand voltage drain is configured to connect a power supply circuit to obtain a supply voltage and output a positive or negative sampling voltage at the withstand voltage source;
a power supply switch tube Q3, including a power supply source, a power supply grid and a power supply drain, in which the power supply drain is configured to connect the power supply circuit to obtain a supply voltage, and the power supply grid is connected with the withstand voltage source, so that the power supply source outputs a positive phase supply voltage;
a positive phase power supply driving module, including a positive phase power supply input terminal and a positive phase power supply output terminal, in which the positive phase power supply input terminal is connected with the power supply source, the positive phase power supply output terminal is connected with the withstand voltage grid, and the positive phase power supply driving module outputs the positive phase supply voltage rise input from the positive phase power supply input terminal from the positive phase power supply output terminal;
a detection control module, including a detection input terminal and a drive output terminal, in which the detection input terminal is connected to the withstand voltage source to obtain the sampling voltage, the drive output terminal is configured to connect a control terminal of the synchronous rectification switch tube, and the detection control module outputs a control signal for turning on/off the synchronous rectification switch tube at the drive output terminal based on the positive or negative value of the sampling voltage; and
a negative phase power supply module, including a charging input terminal and a negative phase power supply output terminal, in which the charging input terminal is connected with the withstand voltage source, the negative phase power supply output terminal is connected with the withstand voltage grid and provides a working voltage for the detection control module (1), and the negative phase power supply module is configured to charge when the withstand voltage source outputs a positive sampling voltage, and provide power to the withstand voltage grid and the detection control module (1) when the withstand voltage source outputs a negative sampling voltage.

By adopting the above technical solution, when the withstand voltage switch tube Q2 obtains a positive supply voltage from the power supply circuit, the working voltage is supplied to the withstand voltage switch tube Q2 in the positive phase power supply drive module through the power supply switch tube Q3. The negative phase power supply module charges and provides the working voltage for the detection control module. When the withstand voltage switch tube Q2 obtains a negative supply voltage from the power supply circuit, the negative phase power supply module provides the working voltage for the withstand voltage switch tube Q2 and the detection control module. Thus, this solution realizes a separation of two power supply modules, that is, the positive supply voltage and the negative supply voltage, and the negative phase supply module can reserve sufficient electric energy, so as to provide a stable overall power supply to the withstand voltage switch tube Q2 to ensure correct sampling.

In addition, when the transformer is just started, the voltage value of the secondary winding is in an unstable state. At this time, since the negative phase power supply module is just started and no electric energy is reserved, it is ensured that the detection control module will not be started, thereby ensuring that the detection control module will only be started when the voltage is stable.

Optionally, the withstand voltage switch tube Q2 and the power supply switch tube Q3 are combined to form a field effect controller Q4.

By adopting the above technical solution, combining the withstand voltage switch tube Q2 with the power supply switch tube Q3 can reduce the number of MOS tubes and simplify the circuit structure of the overall synchronous rectification sampling control circuit can be simplified, while reducing the occupied area of the overall circuit is reduced, so as to achieve the effect of cost reduction.

Optionally, it further includes a clamping module, which is connected to the withstand voltage grid of the withstand voltage switch tube Q2 for clamping the withstand voltage grid voltage of the withstand voltage switch tube Q2 to a first preset voltage.

By adopting the above technical solution, the clamping module stabilizes the withstand voltage grid voltage of the clamping withstand voltage switch tube Q2 to the first preset voltage, so as to ensure the stability of the input voltage and avoid excessive input voltage.

Optionally, the clamping module includes a clamping capacitor C3 and a voltage zener diode Z1 in parallel with each other.

By adopting the above technical solution, the clamping capacitor C3 is used to prevent the voltage mutation of the voltage grid voltage of the clamping withstand voltage switch tube Q2, and the voltage grid voltage of the clamping withstand voltage switch tube Q2 is stabilized by the zener diode Z1.

Optionally, the negative phase power supply module includes a power supply sub-module and a charging capacitor C2, and a node between the power supply sub-module and the charging capacitor C2 forms the negative phase power supply output terminal.

By adopting the above technical solution, the power supply sub-module enables the charging capacitor C2 to charge by turning on the charging circuit when the positive voltage is input, and the charging circuit is closed to discharge the charging capacitor C2 when a negative voltage is input, realizing the effect of passing the driving voltage under a negative voltage.

Optionally, the positive phase power supply driving module is a charge pump.

By adopting the above technical solution, the charge pump has a simple structure and can play the effect of boosting voltage, so as to provide a stable supply voltage under the positive phase power supply drive.

Optionally, a positive phase power supply diode D3 unidirectionally conductive to a withstand voltage grid side is arranged between the positive phase power supply output terminal and the withstand voltage grid, and a negative phase power supply diode D2 unidirectionally conductive to the withstand voltage grid side is arranged between the negative phase power supply output terminal and the withstand voltage grid.

By adopting the above technical solution, by providing the positive phase power supply diode D3 and the negative phase power supply diode D2, the voltage at the output terminal of the negative phase power supply is not higher than the voltage at the output terminal of the positive phase power supply during the charging process, ensuring that the charging capacitor C2 continuously charges when the positive voltage is input, and the voltage at the output terminal of the negative phase power supply is higher than that at the output terminal of the positive phase power supply when inputting the negative voltage, so as to realize the power supply of the charging capacitor C2 and achieve a final separate power supply of the final positive phase power supply output section and the negative phase power supply output terminal.

In a second aspect, the present application provides a control method of synchronous rectification sampling control circuit, which adopts the following technical solution.

A control method based on the synchronous rectification sampling control circuit described in the first aspect includes the steps of:

providing the working voltage for the withstand voltage grid by the positive phase power supply output terminal of the positive phase power supply driving module, the negative phase power supply module charging, and providing the working voltage for the detection control module by the negative phase power supply module, when the withstand voltage switch tube Q2 obtains a positive supply voltage from the power supply circuit; and providing the working voltage for the withstand voltage grid and the detection control module by the negative phase power supply output terminal of the negative phase power supply module, when the withstand voltage switch tube Q2 obtains a negative supply voltage from the power supply circuit.

In a third aspect, the present application provides a synchronous rectification sampling control chip, which adopts the following technical solution.

A synchronous rectification sampling control chip includes a synchronous rectification sampling control circuit as described in the first aspect.

To sum up, this application achieves at least one of the following beneficial technical effects.

1. It realizes the separation of two power supply modules, that is, positive supply voltage and negative supply voltage, and the negative phase supply module can reserve sufficient electric energy, providing a stable overall power supply to ensure correct sampling.

2. Combining the withstand voltage switch tube Q2 and the power supply switch tube Q3 to form the field effect controller Q4 reduces the number of MOS tubes, simplifies the circuit structure of the overall synchronous rectification sampling control circuit, and reduces the occupied area of the overall circuit.

3. Only one field effect controller Q4 is used to realize the functions of circuit power supply and sampling at the same time, which simplifies the circuit connection structure and improves the work efficiency.

4. By using the above circuit structure, the synchronous rectification chip can work at an output high-voltage end or an output low-voltage end.

DETAILED DESCRIPTION

The present application will be further described in detail below in combination with FIGS. 1-2.

An embodiment of the present application discloses a synchronous rectification sampling control circuit. As shown in FIG. 1, the circuit is used to sample and detect the supply voltage on the secondary winding power supply circuit in the synchronous rectifier circuit of a transformer, detect the positive and negative values of the supply voltage, and output a control signal to realize the switching of the synchronous rectification switch Q1 of the power supply circuit in the synchronous rectifier circuit. The realizing includes turning off the synchronous rectification switch Q1 when the power supply circuit of the secondary winding of the transformer is at a positive voltage; and turning on the synchronous rectification switch Q1 when the secondary winding of the transformer is at a negative voltage, so as to reduce the rectifier power consumption.

Figure 1:
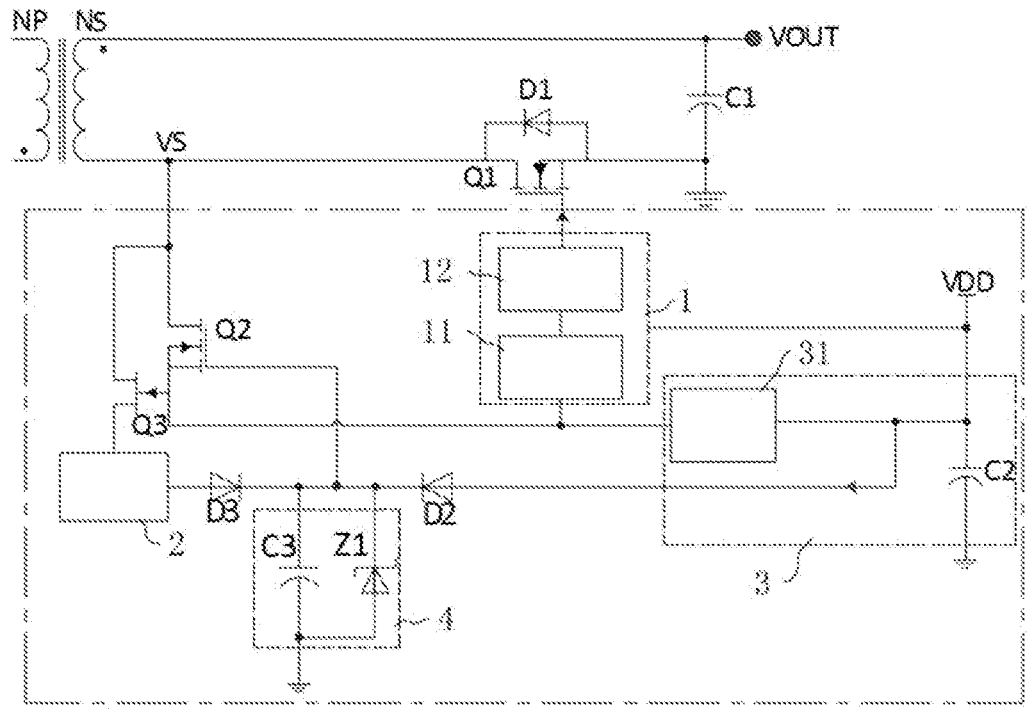
FIG. 1 is a circuit diagram of a synchronous rectification sampling control circuit using separate withstand voltage switch and power supply switch.

Specifically, referring to FIG. 1, the synchronous rectification sampling control circuit includes a withstand voltage switch tube Q2 and a detection control module 1. The withstand voltage switch tube Q2 is connected to a power supply circuit, obtains the supply voltage of the power supply circuit, and outputs a sampling voltage appropriate to be detected by the detection control module 1. The detection control module 1 obtains the sampling voltage and outputs a control signal based on the positive and negative values of the sampling voltage to control the on/off of the rectifier MOS transistor Q1 on the power supply circuit.

Further, referring to FIG. 1, in order to enable the withstand voltage switch tube Q2 and the detection control module 1 to be in the working state without power supply of other power circuits, the synchronous rectification sampling control circuit further includes a power supply switch tube Q3 for self power supply, a positive phase power supply drive module 2, a negative phase power supply module 3 and a clamping module 4. In particular, the power supply switch tube Q3 is connected between the power supply circuit and the positive phase power supply drive module 2, and turned on when the sampling voltage is positive, so as to turn on the positive phase power supply drive module 2 to power the withstand voltage switch tube Q2 and the detection control module 1. The negative phase power supply module 3 receives the sampling voltage output by the withstand voltage switch tube Q2 and powers the detection control module 1; the negative phase power supply module 3 is charged when the withstand voltage switch tube Q2 outputs a positive sampling voltage; and the negative phase power supply module 3 powers the withstand voltage switch tube Q2 when the withstand voltage switch tube Q2 outputs a negative sampling voltage.

The reason why the negative voltage module is used to detect the detection control module 1 is that the voltage value of the secondary winding is unstable when the transformer is just started. At this time, because the negative phase power supply module has just started and no power is reserved, it is ensured that the detection control module 1 will not be started, thereby ensuring that the detection control module will only be started when the voltage is stable, which improves the stability of the overall circuit.

Referring to FIG. 1, the withstand voltage switch tube Q2 includes a withstand voltage source, a withstand voltage grid and a withstand voltage drain. The withstand voltage drain is configured to connect the power supply circuit to obtain a supply voltage, and the withstand voltage source outputs a sampling voltage. In order to realize the withstand voltage characteristic, the withstand voltage switch tube Q2 generally adopts LDMOS. LDMOS can convert the high voltage value obtained from the power supply circuit into a sampling voltage appropriate for sampling to the detection control module 1 without voltage division. Meanwhile, in order to prevent the positive phase power supply drive module 2 from supplying power when the supply voltage is negative, the negative phase power supply module 3 can supply power when the supply voltage is positive. The positive phase power supply driving module 2 and the withstand voltage grid are provided with a positive phase power supply diode D3 that is unidirectionally conductive to a withstand voltage grid side, and the negative phase power supply driving module and the withstand voltage grid are provided with a negative phase power supply diode D2 that is unidirectionally conductive to the withstand voltage grid side.

Referring to FIG. 1, the detection control module 1 includes an acquisition and detection sub-module 11 and a drive control sub-module 12. The output terminal of the acquisition and detection sub-module 11 is connected with an input terminal of the drive control sub-module 12. The acquisition and detection sub-module 11 has a detection input terminal, and the detection input is connected with a withstand voltage source to obtain the sampling voltage. The drive control sub-module 12 has a drive output terminal, which is configured to connect the control terminal of the synchronous rectification switch tube. Based on the positive and negative values of the sampling voltage, the acquisition and detection sub-module 11 outputs a control signal for turning on/off the synchronous rectification switch tube at the drive output terminal through the drive control sub-module 12.

Referring to FIG. 1, the power supply switch tube Q3 includes a power supply source, a power supply grid, and a power supply drain. The power supply drain is configured to connect the power supply circuit to obtain the supply voltage, the power supply grid of the power supply switch tube Q3 is connected to the withstand voltage source, and the power supply source is connected to the positive phase power supply drive module 2 to provide the positive phase supply voltage for the positive phase power supply drive module 2. In particular, the power supply switch tube Q3 is a JFET device. When the power supply grid has no input or positive voltage input, the power supply switch tube Q3 turns on and outputs a positive phase supply voltage with positive voltage. When a negative value voltage of the power supply grid is input, the power supply switch tube Q3 is still on, but the positive phase supply voltage with negative voltage is output, under which the positive phase power supply drive module 2 cannot work and amplify.

Figure 2:
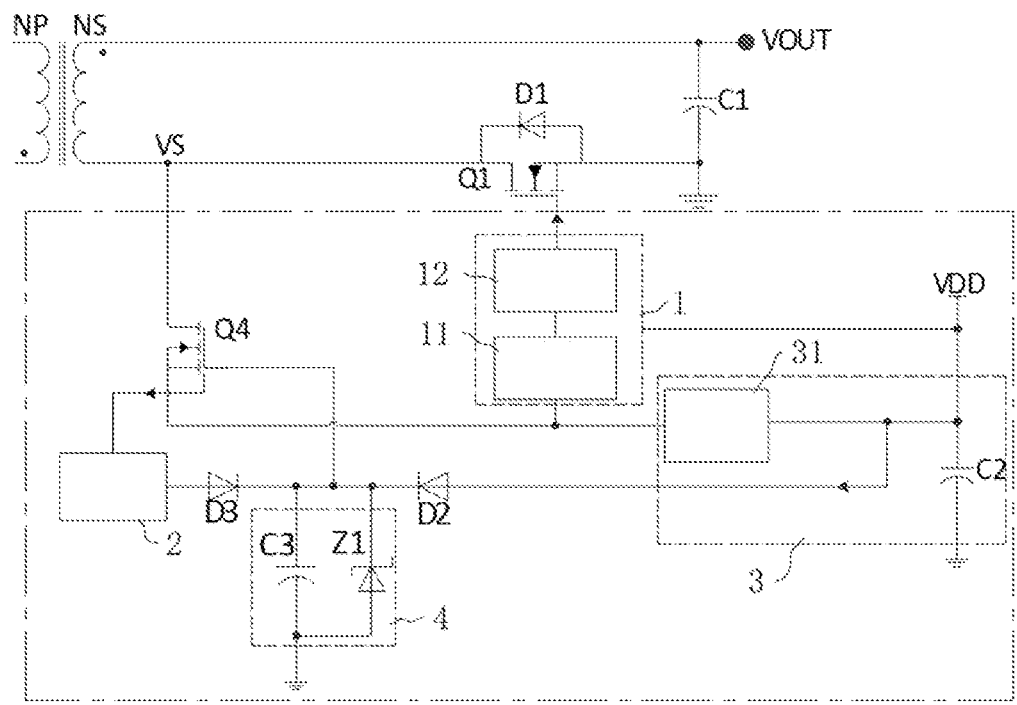
FIG. 2 is a circuit diagram of synchronous rectification sampling control circuit using composite withstand voltage switch and power supply switch.

Further, as shown in FIG. 2, in one embodiment, the withstand voltage switch tube Q2 and the power supply switch tube Q3 are combined to form a field effect controller Q4. The field effect controller Q4 is an LDMOS with parasitic JFET, and the LDMOS with parasitic JFET is integrated from the original six pins into four pins, in which the withstand voltage drain and power supply drain are integrated into one pin, and the power supply gate is built into the LDMOS with parasitic JFET. Combining the withstand voltage switch tube Q2 and the power supply switch tube Q3 can reduce the number of MOS tubes in the sampling control circuit, simplify the circuit structure of the overall synchronous rectification sampling control circuit, and reduce the occupied area of the overall circuit, so as to achieve the effect of reducing costs.

Referring to FIG. 1, the positive phase power supply drive module 2 includes a positive phase power supply input terminal and a positive phase power supply output terminal. The positive phase power supply input terminal is connected to the power supply source, and the positive phase power supply output terminal is connected to the positive phase power supply diode D3. The positive phase power supply drive module 2 boosts the positive phase supply voltage input at the positive phase power supply input terminal and outputs it from the positive phase power supply output terminal. In particular, the positive phase power supply drive module 2 is a charge pump. The charge pump generates a sufficiently high driving voltage for the withstand voltage grid to ensure the normal operation of the withstand voltage switch tube Q2 under the positive supply voltage.

Referring to FIG. 1, the negative phase power supply module 3 includes a charging input terminal and a negative phase power supply output terminal. The charging input terminal is connected with a withstand voltage source, and the negative phase power supply output terminal is connected with a withstand voltage grid and provides a working voltage for the detection control module 1. In particular, the negative phase power supply module 3 includes a power supply sub-module 31 and a charging capacitor C2, the input terminal of the power supply sub-module 31 is connected with a withstand voltage source, the output terminal of the power supply sub-module 31 is connected with one end of the charging capacitor C2, and the other end of the charging capacitor C2 is grounded. A node between the power supply sub-module 31 and the charging capacitor C2 forms the negative phase power supply output terminal, which is connected to the negative phase power supply diode D2 and powers the detection control module 1 at the same time. Among them, the power supply sub-module 31 has a switching device, which can be turned on when the withstand voltage source outputs positive voltage, so that the charging capacitor C2 is charged. When the withstand voltage source outputs a negative voltage, the charging capacitor C2 releases electric energy to the withstand voltage grid and the detection control module 1.

Referring to FIG. 1, the clamping module 4 is connected to the withstand voltage grid of the withstand voltage switch tube Q2 for clamping the withstand voltage grid voltage of the withstand voltage switch tube Q2 to a first preset voltage. The clamping module 4 includes a clamping capacitor C3 and a zener diode Z1 in parallel with each other. One end of the clamping capacitor C3 and the zener diode Z1 is connected to the withstand voltage grid, and the other end thereof is grounded. The clamping capacitor C3 prevents a voltage mutation of the voltage grid voltage of the clamping withstand voltage switch tube Q2, and the zener diode Z1 stabilizes the withstand grid voltage of the clamping withstand voltage switch tube Q2 at a voltage consistent with its own characteristics. In particular, the first preset voltage value can be adjusted by replacing the zener diode Z1.

The synchronous rectification sampling control circuit according to one embodiment of the present application can be implemented as follows. When the withstand voltage switch tube Q2 obtains a positive supply voltage from the power supply circuit, a working voltage is supplied to the withstand voltage switch tube Q2 in the positive phase power supply drive module 2 through the power supply switch tube Q3. The negative phase power supply module 3 charges and provides the working voltage for the detection control module 1. When the withstand voltage switch tube Q2 obtains a negative supply voltage from the power supply circuit, the negative phase power supply module 3 supplies the working voltage to the withstand voltage switch tube Q2 and the detection control module 1. Thus, this embodiment realizes a separation of the positive supply voltage from the negative supply voltage, and the negative phase power supply module 3 can reserve sufficient electric energy, so as to provide a stable overall power supply to the withstand voltage switch tube Q2 to ensure correct sampling.

An embodiment of the present application further discloses a synchronous rectification sampling control chip. The synchronous rectification sampling control circuit disclosed in the above embodiment is integrated in the synchronous rectification sampling control chip. It can sample and detect a supply voltage in a secondary winding power supply circuit in the transformer synchronous rectifier circuit, and output a control signal to the MOS switch of the power supply circuit in the synchronous rectifier circuit by detecting the positive and negative values of the supply voltage.

The above are the preferred embodiments of this application, which does not limit the scope of protection of this application. Therefore, all equivalent changes made according to the structure, shape and principle of this application should be covered by the scope of protection of this application.

LISTING OF REFERENCE SIGNS

2 Positive phase power supply driving module
12 Drive control sub-module
11 Acquisition and detection sub-module
13 Power supply sub-module.

What is claimed is:

1. A synchronous rectification sampling control circuit, comprising:
a withstand voltage switch tube, comprising a withstand voltage source, a withstand voltage grid and a withstand voltage drain, wherein the withstand voltage drain is configured to connect to a secondary winding power supply circuit in a synchronous rectification circuit of a transformer to obtain a supply voltage and output a positive or negative sampling voltage at the withstand voltage source;
a power supply switch tube, comprising a power supply source, a power supply grid and a power supply drain, wherein the power supply drain is configured to connect to the secondary winding power supply circuit in the synchronous rectification circuit of the transformer to obtain the supply voltage, and the power supply grid is connected with the withstand voltage source, so that the power supply source outputs a positive phase supply voltage;
a positive phase power supply driving module, comprising a positive phase power supply input terminal and a positive phase power supply output terminal, wherein the positive phase power supply input terminal is connected with the power supply source, and the positive phase power supply output terminal is connected with the withstand voltage grid;
a detection control module, comprising a detection input terminal and a drive output terminal, wherein the detection input terminal is connected to the withstand voltage source to obtain a sampling voltage, the drive output terminal is configured to connect to a control terminal of a synchronous rectification switch tube, and the detection control module outputs a control signal for turning on/off the synchronous rectification switch tube at the drive output terminal based on a positive value or a negative value of the sampling voltage; and
a negative phase power supply module, comprising a charging input terminal and a negative phase power supply output terminal, wherein the charging input terminal is connected with the withstand voltage source, the negative phase power supply output terminal is connected with the withstand voltage grid and provides a working voltage for the detection control module, and the negative phase power supply module is configured to charge when the withstand voltage source outputs the positive sampling voltage, and provide power to the withstand voltage grid and the detection control module when the withstand voltage source outputs the negative sampling voltage.

2. The synchronous rectification sampling control circuit according to claim 1, wherein the withstand voltage switch tube and the power supply switch tube are combined to form a field effect controller.

3. The synchronous rectification sampling control circuit according to claim 1, further comprising a clamping module connected to the withstand voltage grid of the withstand voltage switch tube for clamping a withstand voltage grid voltage of the withstand voltage switch tube to a first preset voltage.

4. The synchronous rectification sampling control circuit according to claim 3, wherein the clamping module comprises a clamping capacitor and a zener diode in parallel with each other.

5. The synchronous rectification sampling control circuit according to claim 1, wherein the negative phase power supply module comprises a power supply sub-module and a charging capacitor, and a node between the power supply sub-module and the charging capacitor forms the negative phase power supply output terminal.

6. The synchronous rectification sampling control circuit according to claim 1, wherein the positive phase power supply driving module is a charge pump.

7. The synchronous rectification sampling control circuit according to claim 1, wherein a positive phase power supply diode unidirectionally conductive to the withstand voltage grid is provided between the positive phase power supply output terminal and the withstand voltage grid, and a negative phase power supply diode unidirectionally conductive to the withstand voltage grid is provided between the negative phase power supply output terminal and the withstand voltage grid.

8. A control method based on the synchronous rectification sampling control circuit according to claim 1, comprising:
    providing the working voltage for the withstand voltage grid by the positive phase power supply output terminal of the positive phase power supply driving module, the negative phase power supply module charging, and providing the working voltage for the detection control module by the negative phase power supply module, when the withstand voltage switch tube obtains the positive phase supply voltage from the secondary winding power supply circuit; and
    providing the working voltage for the withstand voltage grid and the detection control module by the negative phase power supply output terminal of the negative phase power supply module, when the withstand voltage switch tube obtains a negative phase supply voltage from the secondary winding power supply circuit.

9. A synchronous rectification sampling control chip, comprising the synchronous rectification sampling control circuit according to claim 1.

* * * * *